Aug. 21, 1934.     J. J. GUEST     1,971,260
HYPERBOLOIDAL WORM GEARING
Filed Oct. 3, 1932

INVENTOR
J. J. GUEST.
BY
ATTORNEY

Patented Aug. 21, 1934

1,971,260

UNITED STATES PATENT OFFICE 1,971,260

HYPERBOLOIDAL WORM GEARING

James John Guest, Abbey Wood, England

Application October 3, 1932, Serial No. 636,055
In Great Britain October 8, 1931

4 Claims. (Cl. 74—458)

This invention relates to an improvement in hyperboloidal worm gearing in which the worm surface is generated as the envelope of a surface carried by a body moving relatively to the worm in the same way as the worm-wheel is to move.

For the purposes of this specification hyperboloidal gearing is defined to be worm gearing connecting a pair of non-intersecting axes, the worm of which is produced by the action of a cutting body rotating about an axis carried by a part revolving about an axis corresponding or approximately corresponding to the intended axis of the worm wheel and moving relatively to the worm as the worm wheel is to move. According to this invention the worm is so produced as to have a main line of contact with the worm wheel near the side of the wheel at which the worm surface is moving outwards.

The above-mentioned carried surface in practice is that swept out by the teeth of a milling cutter or by the cutting portions of the particles of a grinding wheel: the latter being the nearer approximation to the geometrical conception and as being the finishing process in manufacture, the term grinding wheel will be hereinafter used for this surface as more explanatory practically, but it and the corresponding terms are to be understood in the wider sense also as explained above.

When a worm is driving a worm wheel, one face of the worm tooth being in action, one side of the worm runs in towards the worm wheel and the other outwards from it; the former is here termed the inward side of the worm and the latter the outward side. The end of the worm at which a tooth commences its action is termed the initial end and the other the final end of the worm. Reversal of the direction of rotation of the worm changes the tooth face and reverses the sides and ends.

Figure 1:
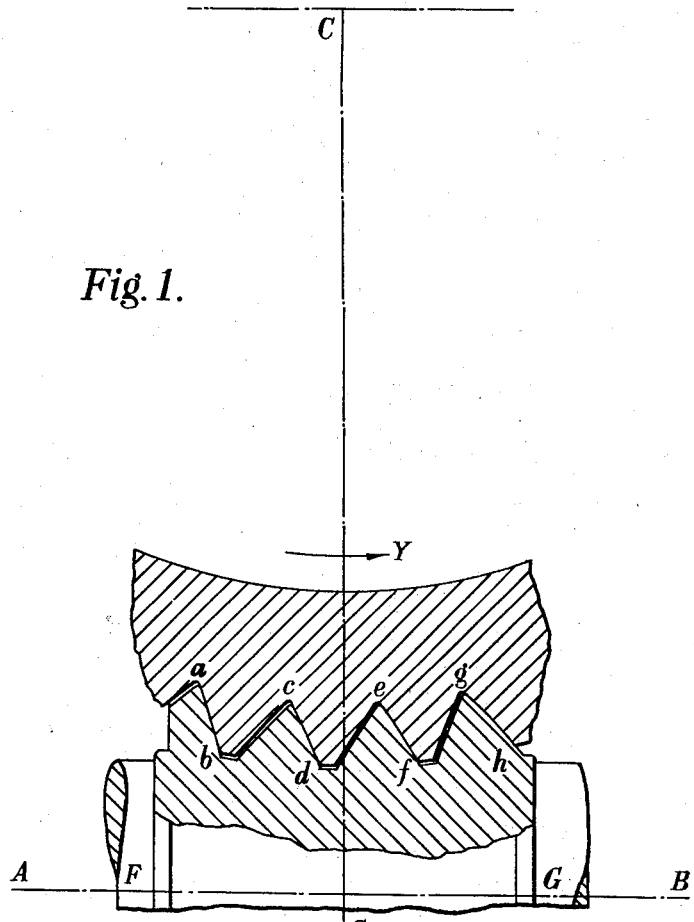
Figure 2:
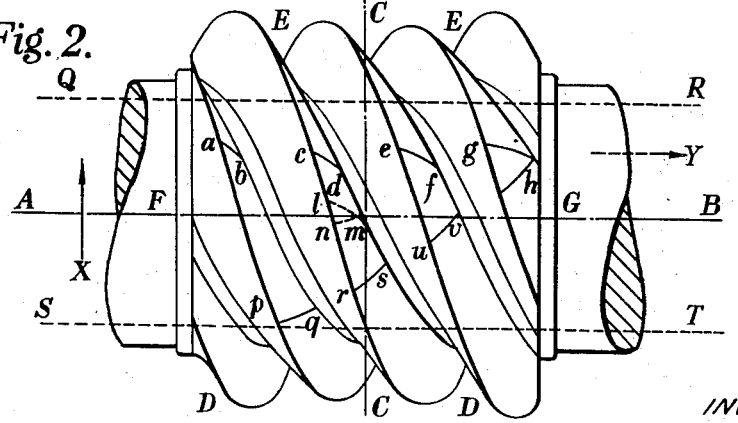

In Figure 1 of the accompanying drawing is shown a diagrammatic side sectional view of the worm, looking parallel to the direction of the worm-wheel axis, the section being taken through the line of contact of the grinding wheel and the worm. In Figure 2 is given a diagrammatic plan view of the worm, the wheel being supposed above it, but removed. In these, AB is the axis of the worm and CC the axis of the worm-wheel: the worm is shown right-handed and as having four starts or threads. Directions of rotation are indicated at X and Y and as shown thus D is the inward and E the outward side of the worm and F and G its initial and final ends respectively. Changes for reversal of direction or for a left-hand worm are easily made and considered and so will not again be referred to. Usually clearance is allowed between the top and bottom of the worm and worm-wheel teeth and between the sides not actively engaged in the action, and this is approximately indicated in the figures.

According to the present invention the arrangement is such that the contact between the grinding wheel and the worm takes place on the outward side and is to be located well away from the central plane of the worm which is the plane through AB perpendicular to CC, so that the grinding-wheel is offset from the central plane of the worm. In producing the worm, the grinding-wheel operates on one face of a tooth of the worm at a time the opposite tooth face being ground by a similar operation, either reversing the worm or otherwise. It is only necessary to consider the face of the tooth which is being generated. At one instant the grinding-wheel makes contact with a tooth of the worm along a line such as is shown at $ab$ in Figures 1 and 2. As the process of generation progresses the worm rotates and the grinding-wheel is carried by the part of the machine moving relatively as the worm-wheel moves, and the line of contact moves simultaneously passing through the positions shown at $cd$, $ef$, $gh$ reaching the position $cd$ after a time approximately $1/n$ of the time of revolution of the worm, where $n$ is the number of starts or threads in the worm.

The lines $ab$, $cd$, $ef$, in Figure 2 are intended to represent the approximate plane of the lines $ab$, $cd$, $ef$, in Figure 1, and the section shown in Figure 1 is not a plane section, but is taken through the line of contact as it changes its position during the process of generating the worm, that is, it is a section made by the surface swept out by the line of contact. This line is defined to be the main contact line and its shape and position depend on the particular shape and setting of the grinding-wheel used. This main line of contact changes its shape and position as it moves along during the generation, swinging sideways, that is perpendicularly to the plane AB, as well as changing its shape, but both these actions are to be confined to comparatively narrow limits.

The worm-wheel is produced by a hob corresponding to the improved worm, that is made so that the edges of its teeth lie on a surface which is the same as the worm surface. It is used in an ordinary worm-gear hobbing machine, which consists of a rotating table, usually and here considered as, horizontal, upon which the worm-wheel blank is mounted concentrically with its axis, which table is arranged to slide horizontally perpendicularly to the (usually) horizontal axis of the bearings which carry the shaft of the hob. These bearings are arranged to be suitably adjustable axially and are carried on a member which slides vertically so that the axis of the hob can be set in the central plane of the worm wheel blank. The hob shaft and rotating table are driven in proper unison by a positively connected drive arranged with a speed change box for giving the desired relative rotational speeds to the hob and table. Whilst the hob and table are in rotation the table is fed along the slide until the axes of the hob and worm-wheel blank are at the correct centre distance. The worm-wheel is, especially in a finishing hob having fine teeth is used, a near approximation to the geometrical mating surface, and will be referred to here as being this surface. Owing to the mode of generation the worm touches the worm-wheel teeth along the lines, such as ab, cd, ef, in which the grinding-wheel touched the worm surface when generating it. Every part of the active surface of the worm comes into contact with the worm-wheel during the motion, but the surface of the worm-wheel with which it makes contact is confined to a band of the surface on which the contact-line lies and moves. Thus there is always one main line of contact between a worm tooth and the worm-wheel surface, maintained from the initial end F to the final end G of the worm, unless this be interfered with, as it sometimes may be, by action of the hob during its feed in when generating the worm-wheel. Ideally this contact is maintained throughout the action of the gear.

In the known method of producing gearing of this nature the grinding-wheel is trued symmetrically about a plane perpendicular to its axis and so that, when the grinding-wheel axis cuts the shortest distance between the axes of the worm AB and of the part of the machine corresponding to the worm-wheel CC, this plane contains the shortest distance referred to. By this symmetry the two faces of a worm tooth can be produced at one action, or the change from one face to the other face of a tooth made simply, as by a small rotational adjustment of the worm. The main line of contact then lies close to the central plane AB usually crossing it in the manner indicated by the line lm in Figure 2, so that the main line action is approximately central. The secondary line of contact then lies close to the main line as indicated by the line mn merging with it at the centre and being of short duration. Hitherto this has been deemed unavoidable, but by this invention where the main line is definitely located well away from the central plane AB on the outwards side of the worm, as shown at ab, cd, ef, the secondary line is separated from the main line and its action is that of an additional load carrying contact enabling a better gear to be produced.

It can be proved that in a hyperboloidal gear, in addition to the main line of contact described above, there can exist another line of contact which will be termed the secondary line. Further investigation shows that the action between the worm and the worm-wheel on the opposite sides of the main contact line are of different natures. The action between the worm and worm-wheel may be considered by viewing the action on sections taken perpendicularly to the wheel axis. On the side of the main contact line towards the inward side of the worm the action corresponds to that between a pair of gear tooth surfaces, which, although in the hob the tooth section changes its shape continuously, mesh and act together in the proper manner, there being contact at one point on the section during the engagement. Thus between the teeth of the worm and worm-wheel there will be a moving line of contact in this space. It can also be proved that corresponding to any point of contact on the main line of contact occurring on the plane through the worm-wheel axis perpendicular to the worm axis, there will occur, in the same plane at an equal distance from the central plane but on the opposite side of it a point of contact in the secondary line. Thus the secondary line system is linked to this cross central plane CC. The secondary line contact moves in the width of the worm-wheel which lies on the inward side of the main contact line. On the outward side of the main contact line there is an effect which might be regarded as a kind of interference, and the contact between the worm teeth and those of the worm-wheel—which must occur from the manner in which the worm-wheel is generated (except where removed by any hob interference)—occurs at the initial end of the worm only and is not a proper gear action and there is an increasing space between the teeth along the length of the worm. This pseudo-contact will, when a worm and worm-wheel are set up in mesh and tested for contact with raddle or blue, give contact marks, but these are illusory as to the value of the contact and action there. This width of worm-wheel beyond that necessary for the lubricant action at and near the main contact line is of little value except as protection from injury to the actual working surface.

The action on the secondary contact tends as an average to be central; whether it all takes place comparatively near the plane CC through the worm-wheel axis perpendicular to the worm axis or is spread over a considerable length of the worm depends upon the main line of contact. In Figure 2 pq, rs, and uv are shown the diagrammatic plans of the secondary lines illustrating its movement. In this case the action starts near the initial end of the worm on the inward side well away from the central plane AB and as the worm turns the line moves onwards and inwards passing from pq through rs and uv. When the secondary action is near the cross central plane CC, it lies at about the same distance from the central plane AB as the main line of contact does when it arrives at the plane CC, but they are on opposite sides of the plane AB. The position and movement of the secondary action is dependent on the main line of contact, which is dependent on the diameter, shape and setting of the grinding-wheel when finishing the worm.

The worm-wheel edge has some position outside the main line of contact and is indicated by the line QR, but as the worm-wheel rim is usually shaped at an angle this edge is merely indicated for purposes of description. As the surfaces of worm and worm-wheel touch at lines ab, cd, ef, they approach closely for some distance on either side of these lines so that the worm-wheel should extend well beyond the main contact line. As the worm-wheel is usually shaped to an angle at its rim, the main contact lines as seen in the plan should run inwards towards AB from the outer ends to the ends at the tooth root. As most worm gears are used to drive in either direction, line ST, indicating the other side of the worm-wheel will be at the same distance from AB as RQ is, and thus it will be beyond the secondary line of contact when at the central plane CC. In the preceding positions this secondary line lies further from the central plane AB and the gear should be so arranged that the secondary line would lie outside ST near the initial end of the worm and so only arises a little later. This can be arranged either by adjusting the worm-wheel width, the worm length, or by altering the main line of contact so as to make the secondary action nearer to the cross central plane CC. The lubricant is then carried directly to the main contact line at the beginning of the action.

Considering the relationship of the worm tooth surface and the worm-wheel surface opposed to it, there is contact both along $ab$ and $pq$ on the same tooth face, while between these two lines the worm surface lifts slightly from the worm-wheel surface so that there is a space between them and outside these two lines the surfaces again separate. As the worm turns the lines change their positions moving to $cd$ and $rs$, and so on, the length of the gap between them decreasing and its depth also. Thus the oil which is carried in freely at the initial end of the worm lies in a continuously diminishing space and serves to lubricate the main line of contact effectively, and so to enable a high load to be carried. If the initial end is not open enough oil should be fed directly to the space between the lines.

No particular shape of wheel for grinding is here referred to and any may be used. Thus by using a pencil wheel a main contact line which is practically straight can be obtained, but satisfactory lines can be secured by wheels which are otherwise better in use, as by a dish wheel trued to a conical shape either with a straight or curved axial section. The setting of the wheel and its axis depend upon the particular shape of wheel section used.

In carrying the invention into effect, a machine of the worm-wheel hobbing type may be used, the worm blank being set up in the place of the hob and the rotary table which normally carries the worm wheel blank set to the correct centre distance. On the rotating table is mounted a slide, the base of which is fitted to the table by a slot and strip perpendicular to its slide, so that the base can be adjusted perpendicularly to the slide and fixed in any desired position. The slide carries a headstock with a spindle at right angles to the slide movement, but carried so that it has rotational adjustment about an axis parallel to the slide. The spindle is provided with driving mechanism and carries the cutter or grinding-wheel.

The general design of worm and worm-wheel, with approximate tooth inclination and depth, and the amount of off-setting of the main line of contact at the bottom of the thread having been decided upon and a cutter and wheel of suitable diameter and shape selected for use, the wheel edge is imagined to be set in its position for cutting the middle part of the worm, either with its edge along the line of the worm bottom helix or slightly twisted therefrom to adjust for the slight variation of the angle of the helix in the hyperboloidal worm, and tilted about this line till the working face comes into the correct position. Then the angle which the wheel spindle makes with the central plane through the worm axis perpendicular to the table axis, the height of the wheel centre above the plane, and the distance of the point where the wheel axis meets the central plane (or table surface) from the line on this plane through the table axis parallel to the line of the slide, are calculated. From these the wheel spindle is set to the correct tilt, and the slide adjusted along the strip and the wheel set axially along the spindle by collars or other adjustment to their calculated positions. The worm axis is then set by the adjustment of the worm hobbing machine till it reaches the correct position. The slide is adjusted up to set the depth of the cuts either of the milling cutter or grinding-wheel, the machine being fitted for a reversing motion to the swing of the table for the latter action, and the process continued until the worm is produced by the action of the machine enforcing the correct relative movements of table and worm blank by the connecting positive gearing arranged by the change wheels. The line of contact of the wheel and the work should be examined and if not as desired, adjusted by making alterations in the size, setting and shape of the wheel.

What I claim is:—

1. Hyperboloidal worm gearing in which the main line of contact between the worm and worm wheel lies on that side of the plane through the worm axis perpendicular to the wheel axis on which the worm surface runs outward from the worm wheel.

2. Hyperboloidal worm gearing in which the main line of contact between the worm and the worm wheel lies near that side of the worm wheel at which the worm surface moves outwards.

3. Hyperboloidal worm gearing which has a main line of contact between the worm and the worm wheel on the outward side of the plane through the worm axis perpendicular to the wheel axis, and also a second line of contact in that part of the gearing lying between the surface traced out by the main line of contact and the side of the worm wheel at which the worm surface is moving inwards.

4. Hyperboloidal worm gearing having two lines of contact on a tooth face, which lines are distinctly separated for the greater part of the length of the worm.

JAMES J. GUEST.